United States Patent [19]

Voruz

[11] Patent Number: 5,109,699
[45] Date of Patent: May 5, 1992

[54] SONIC CASTING TESTER

[75] Inventor: James T. Voruz, Oconomowoc, Wis.

[73] Assignee: Husco International, Waukesha, Wis.

[21] Appl. No.: 713,140

[22] Filed: Jun. 10, 1991

[51] Int. Cl.$^5$ .............................................. G01H 15/00
[52] U.S. Cl. ......................................... 73/632; 73/592; 73/599
[58] Field of Search .............. 73/592, 596, 600, 632, 73/168, 579, 37, 599

[56] References Cited

U.S. PATENT DOCUMENTS

| | | | |
|---|---|---|---|
| 1,884,042 | 10/1932 | Marlin | 73/37 |
| 4,480,473 | 11/1984 | Varterasian et al. | 73/40.5 |
| 4,653,327 | 3/1987 | Varterasian et al. | 73/596 |
| 4,821,769 | 4/1989 | Mills et al. | 73/600 |

Primary Examiner—Hezron E. Williams
Assistant Examiner—Howard Wisnia
Attorney, Agent, or Firm—Andrus, Sceales, Starke & Sawall

[57] ABSTRACT

A method and apparatus for detecting a blockage in a cored passage of a hydraulic valve casting includes a sound generating device disposed within the spool bore and communicating with the passageway so that a sound wave may be introduced into the passageway and a sound detecting device disposed within the spool bore and communicating with an opposite end of the passageway so that the level of sound transmitted through the passageway may be detected.

3 Claims, 1 Drawing Sheet

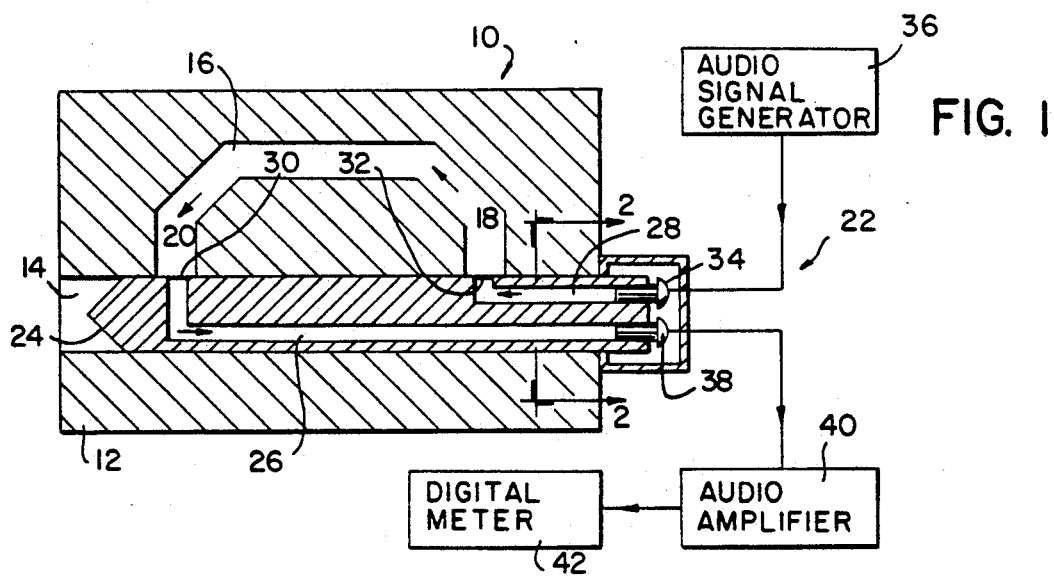
FIG. 1
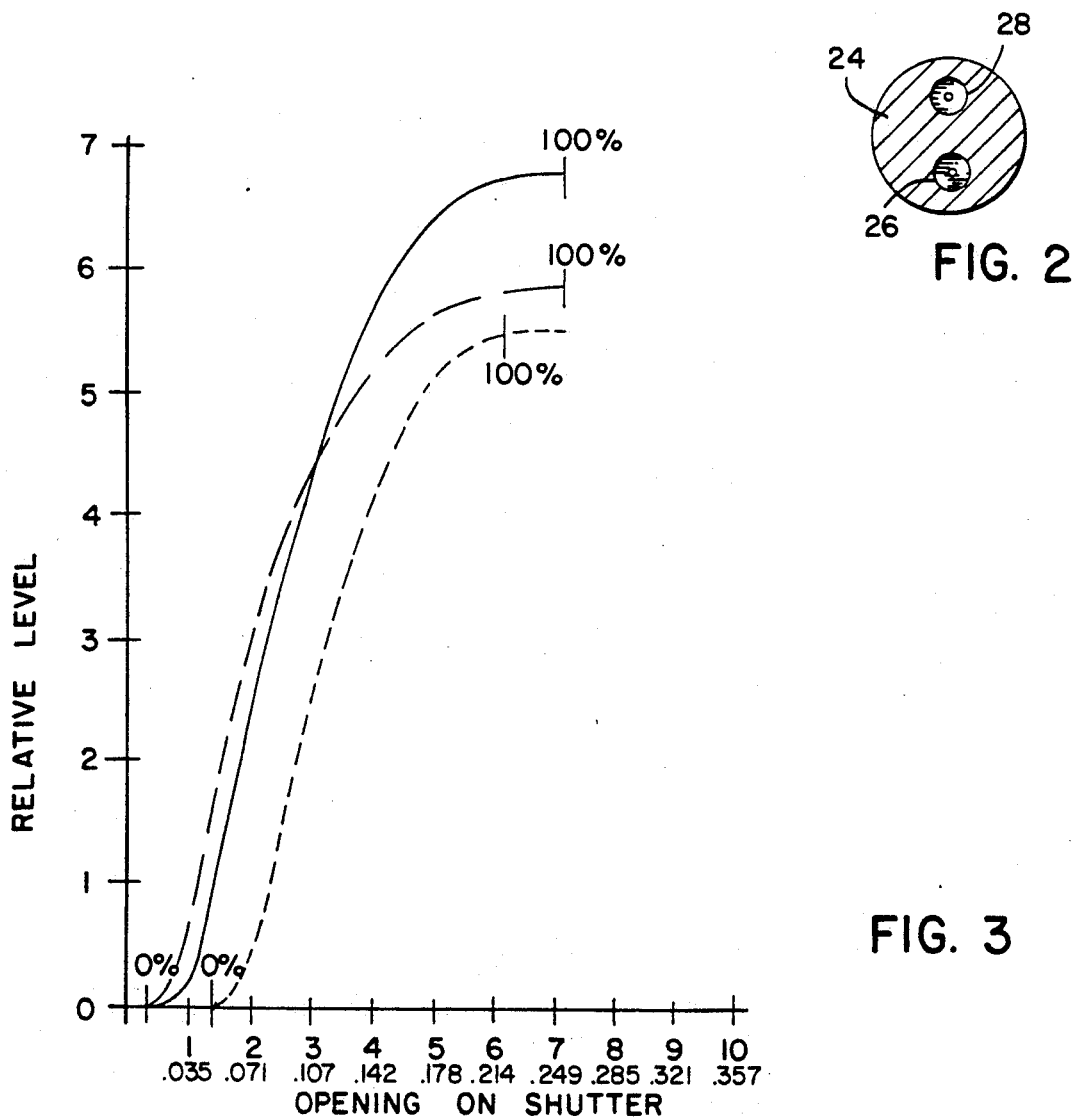
FIG. 2
FIG. 3

SONIC CASTING TESTER

BACKGROUND OF THE INVENTION

The present invention relates to an apparatus for detecting blockages in the passageways of hydraulic valve castings and more specifically to an apparatus that utilizes the transmission and detection of sound waves to detect such blockages.

Hydraulic valves are manufactured from castings that incorporate a number of passageways. Typically, one of the passageways will accommodate a moving spool that either allows or prohibits communication between a number of other passageways which carry hydraulic fluid to and from pumps, work ports and a hydraulic fluid reservoir. These passageways typically intersect the main spool bore and because of their location, they cannot be visually inspected for blockages.

In the past, these passageways were tested for blockages by utilizing a source of air at high pressure and a blockage was determined by a decrease or deviation in the air flow. This prior art method was not always completely reliable and since it involved the use of very high air pressures, the flow of air through the valve resulted in an extremely high noise level which made it very difficult, if not impossible, for a worker to test valves for a prolonged period of time.

The present invention is directed toward a method and apparatus for testing the passageways of the hydraulic valve in a manner that is reliable and convenient for the worker performing the test.

SUMMARY OF THE INVENTION

An apparatus for detecting a blockage in a cored passage of a hydraulic valve casting of the type having a valve body with a spool bore disposed therein and at least one fluid passageway in the valve body communicating with and intersecting the spool bore includes a sound generating means disposed within the spool bore and communicating with one of the intersection points so that a sound wave may be introduced into the passageway.

In accordance with one aspect of the invention, a powered signal generating means is operatively connected to the sound generating means so that a generated signal can be transformed into a sound wave by the sound generating means.

In accordance with yet another aspect of the invention, sound detecting means are disposed within the spool bore and communicate with another of the passageway intersection points so that the sound detecting means can generate a signal in response to the detection of a sound wave transmitted through the passageway.

In accordance with still another aspect of the invention, level indicating means are operatively connected to the sound detecting means so that the level of the detected sound may be displayed.

The present invention thus provides a reliable, safe and convenient way of testing for blockages in the fluid passageways of a hydraulic valve casting.

BRIEF DESCRIPTION OF THE DRAWINGS

The drawings illustrate the best mode presently contemplated of carrying out the invention.

In the drawings:

FIG. 1 is a schematic of a sonic casting tester constructed according to the present invention shown in use with a hydraulic valve casting;

FIG. 2 is a sectional view along the line 2—2 of FIG. 1; and

FIG. 3 is a graph showing test results for the sonic casting tester.

DETAILED DESCRIPTION OF THE INVENTION

As shown schematically in FIG. 1, a hydraulic valve casting 10 includes a valve body 12 which has been cast with a spool bore 14 and a hydraulic fluid bridge passageway 16 which intersects spool bore 14 at intersection points 18 and 20.

Sonic testing apparatus 22 includes a probe 24 dimensioned to fit within spool bore 14. Probe 24 includes a pair of passageways 26 and 28, each of which has an end that terminates in an opening 30 and 32 respectively in the side wall of probe 24. Passageways 26 and 28 are dimensioned so that their respective openings 30 and 32 will align with intersection points 18 and 20 of valve passageway 16.

A sound generating means such as a miniature speaker 34 is disposed in the other end of passageway 28 in probe 24 and is operatively connected to an audio signal generator 36 which may be a device such as the model 3011B Function Generator manufactured by BK Precision.

A sound detection device such as a miniature microphone 38 is disposed in the end of passageway 26 opposite opening 30. Microphone 38 is operably connected to an audio amplifier 40 which is in turn connected to a digital meter 42.

In operation, probe 24 is inserted into spool bore 14 of the valve to be tested. A sound wave is then generated by speaker 34 and the wave travels through passage 28 out side wall opening 32 and through hydraulic passageway 16. The sound wave then enters opening 30 of passageway 26 and travels to microphone 38. The detected sound is then amplified by amplifier 40 and that level is displayed by digital meter 42. This level can then be compared to the known level for an open passageway and thus, it can be determined whether or not a blockage exists within passageway 16.

FIG. 3 illustrates the result of a test in which a variable shutter was placed within passageway 16 so as to simulate varying degrees of blockage. The test results are for three different valve castings and the slight horizontal and vertical variation of the curves are due to differences in the position and geometry of the valve passageways. The test was conducted utilizing a 1500 Hz. square wave and 250 MV A.C. applied at the terminals of speakers 34.

As seen by the graph in FIG. 3, the relative level of sound detected drops dramatically for even a small blockage in passageway 16. Thus, even a relatively minor blockage will be easily detected due to the dramatic drop in the level of sound detected.

Various modes of carrying out the invention are contemplated as being within the scope of the following claims particularly pointing out and distinctly claiming the subject matter regarded as the invention.

I claim:

1. An apparatus for detecting a blockage in a cored passage of a hydraulic valve casting of the type having a valve body with a spool bore disposed therein and at least one fluid passageway in the valve body communicating with and intersecting the spool bore at a plurality of points, said apparatus comprising:
- an elongated probe for insertion into the spool bore with said probe having a pair of passageways
  with one of said probe passageways having a first end terminating in an opening in said probe which aligns with one of the intersection points and having a second end communicating with sound generating means which introduces a sound wave into said probe passageway and
  with the other of said probe passageways having a first end terminating in an opening in said probe and having a second end communicating with sound detecting means which generates a signal in response to the detection of a sound wave,
- so that a sound wave may be transmitted from said sound generating means, through said one probe passageway, out said first end opening, through the fluid passageway, into said other passageway opening, through said other probe passageway and to said sound detecting means,
- powered signal generating means operatively connected to said sound generating means whereby a generated signal is transformed into a sound wave by said sound generating means, and
- level indicating means operatively connected to said sound detecting means so that the level of said sound detection signal may be displayed.

2. The apparatus defined in claim 1 wherein said sound generating means comprises a speaker and said signal generating means comprises a wave generator.

3. The apparatus defined in claim 1 wherein said sound detecting means comprises a microphone and said level indicating means comprises a metering and display of the voltage of the signal generated by the microphone.

* * * * *